United States Patent [19]
Uffel

[11] Patent Number: 6,100,907
[45] Date of Patent: Aug. 8, 2000

[54] MULTI-BEAM SYSTEM WITH BEAM CONTROL USING AN ELECTROSTATIC VOLTAGE SENSOR

[75] Inventor: Bruno Van Uffel, St Katelijne-Waver, Belgium

[73] Assignee: Xeikon NV, Mortsel, Belgium

[21] Appl. No.: 09/059,430

[22] Filed: Apr. 14, 1998

Related U.S. Application Data

[60] Provisional application No. 60/049,094, Jun. 9, 1997.

[30] Foreign Application Priority Data

Apr. 29, 1997 [EP] European Pat. Off. .............. 97201284

[51] Int. Cl.[7] .................................................... B41J 2/385
[52] U.S. Cl. .......................... 347/133; 347/236; 347/237; 358/300
[58] Field of Search .................................... 347/122, 133, 347/236, 237, 246, 247; 358/300; 399/177

[56] References Cited

U.S. PATENT DOCUMENTS 4,788,560  11/1988  Miura ....................................... 347/236
5,061,949  10/1991  Ogino et al. .
5,278,586   1/1994  Yoneda et al. .......................... 347/116
5,774,165   6/1998  Nakajima et al. ...................... 347/236
5,812,892   9/1998  Miyoshi et al. ........................ 347/236

OTHER PUBLICATIONS

Patent Abstracts of Japan, Pub. No. 63303373, Dec. 9, 1988, Satoru et al., "Color Image Forming Device".

Patent Abstracts of Japan, Pub. No. 61249066, Nov. 6, 1986, Haruhisa, "Electrostatic Recording Device".

Patent Abstracts of Japan, Pub. No. 58127955, Jul. 30, 1983, Yuji et al., "Electrophotographic Printer".

*Primary Examiner*—Arthur T. Grimley
*Assistant Examiner*—William A. Noe
*Attorney, Agent, or Firm*—Larson & Taylor

[57] ABSTRACT

A multi-beam scanning system has a beam control using an Electrostatic Voltage Sensor or an Image Density Sensor on the Organic Photoconductor. The laser beams can be attuned according to the voltage or density results. This results in a more reliable system as compared to the use of one or more photodetectors.

9 Claims, 7 Drawing Sheets

| Patch nr | Output level | Electrostatic Voltage Beam 1 | Electrostatic Voltage Beam 2 |
|---|---|---|---|
| 0 | 0 | 375 | 400 |
| 1 | 68 | 360 | 382 |
| 2 | 136 | 341 | 364 |
| 3 | 204 | 322 | 345 |
| 4 | 272 | 303 | 327 |
| 5 | 340 | 285 | 308 |
| 6 | 408 | 266 | 290 |
| 7 | 476 | 248 | 271 |
| 8 | 544 | 229 | 253 |
| 9 | 612 | 211 | 235 |
| 10 | 680 | 192 | 216 |
| 11 | 748 | 174 | 198 |
| 12 | 816 | 155 | 180 |
| 13 | 885 | 137 | 161 |
| 14 | 954 | 118 | 142 |
| 15 | 1023 | 100 | 124 |

*FIG. 5a*

| LUT Beam 1 | |
|---|---|
| INPUT | OUTPUT |
| 0 | 0 |
| 1 | 68 |
| 2 | 136 |
| 3 | 204 |
| 4 | 272 |
| 5 | 340 |
| 6 | 408 |
| 7 | 476 |
| 8 | 544 |
| 9 | 612 |
| 10 | 680 |
| 11 | 748 |
| 12 | 816 |
| 13 | 885 |
| 14 | 954 |
| 15 | 1023 |

*FIG. 5c*

| LUT Beam 2 | |
|---|---|
| INPUT | OUTPUT |
| 0 | 88 |
| 1 | 136 |
| 2 | 224 |
| 3 | 290 |
| 4 | 359 |
| 5 | 427 |
| 6 | 495 |
| 7 | 564 |
| 8 | 632 |
| 9 | 701 |
| 10 | 769 |
| 11 | 837 |
| 12 | 906 |
| 13 | 975 |
| 14 | 1044 |
| 15 | 1110 |

*FIG. 5d*

MULTI-BEAM SYSTEM WITH BEAM CONTROL USING AN ELECTROSTATIC VOLTAGE SENSOR

This application claims the benefit of Provisional Application No. 60/049,094 filed Jun. 9, 1997.

FIELD OF THE INVENTION

The present invention relates to a method and apparatus for laser intensity control in a multi-beam system in the field of electrophotographic printers.

BACKGROUND OF THE INVENTION

This invention relates to a multi-beam scanning system with an exposure control device and more particularly, to an image-forming apparatus such as a laser printer performing a scanning exposure step by a multi-beam laser on a photosensitive medium and thereafter developing and fixing.

Digital printers of this type using a multi-beam laser scanner, are able to generate a plurality of beams, resulting in an increased printing speed.

In order to generate a plurality of beams, a plurality of light sources are used, which need to be controlled efficiently in order to correct the intensity of each beam. Alternatively a plurality of beams can be generated by one light source with the help of a beam splitter.

Prior art techniques use a light-monitoring element, a photodiode for each laserbeam. In this case, the power of each laserbeam, expressed in mW, is independently controlled in accordance with an output from each light-monitoring element.

U.S. Pat. No. 4 788 560 discloses a multi-beam scanning apparatus allowing to eliminate a drawback of the conventional apparatus, i.e. the need for providing as many sensors for measuring the optical power as there are scanning beams. One single light intensity sensor is provided, thereby realizing a simple arrangement and an inexpensive apparatus.

Prior art systems measure the laser beam intensities by means of intensity sensors, that need to react very fast and do not take into account the sensitivity changes of the drum or belt due to temperature fluctuations and aging. In other words, there remains a need to have a reliable system that assures an homogeneous exposure on the photosensitive member.

JP61249066 creates an invariably stable black density image by measuring the potential on a photoconductive recording medium which is exposed and discharged electrostatically. According to the measurement result of the potential detection sensor, the quantity of light of the single beam exposing device is controlled.

In JP 63303373 plural image exposing devices are used to discriminate color images.

Every image exposing device creates an electrostatic image of one specific colour. The intensity of each of the exposing devices is adjusted in order to get a colour balanced image. The result is a stable image, but each colour component is generated by one laser beam only.

OBJECTS OF THE INVENTION

It is an object of the present invention to provide a multi-beam scanning apparatus wherein the homogeneity of the latent image, produced on a photosensitive member by the beams, is improved.

Further objects of the present invention are to provide an improved multi-beam scanning apparatus and a method of operating the apparatus wherein the intensity of the laser beams is controlled without using a photodetector.

SUMMARY OF THE INVENTION

The above-mentioned objects are realised by a system for generating a latent image on a photosensitive member comprising:
  means for generating a first light beam and a second light beam, each having an optical power;
  a photosensitive member for exposure by said first and second light beam, thereby modifying a first and a second electrostatic voltage on a first and second location on said member;
  an electrostatic voltage sensor for sensing said first and second electrostatic voltage, thereby generating a first and a second output signal;
  characterized in that said system has:
  means for comparing said first and second output signals, thereby generating a comparison result;
  means for controlling said optical power of said first light beam based on said comparison result.

Conveniently the system includes an optical scanning means for deviating said first and second light beam to said photosensitive member.

Preferably, said photosensitive member converts local exposure by a light beam to a local electrostatic voltage on said member.

In one convenient system said light beam generating means include a laser or a laser diode.

A further system provided by the invention preferably includes:
  means for generating a first test pattern on said photosensitive member, by said first light beam;
  means for generating a second test pattern on said photosensitive member, by said second light beam;
  means for comparing the electrostatic voltage sensed on said first test pattern with the electrostatic voltage sensed on said second test pattern thereby generating said comparison result.

Preferably said means for comparing is arranged for equalizing the electrostatic voltage achieved by exposure by a plurality of light beams including said first and second light beam.

Conveniently, said first and second light beam are arranged to create pairs of adjacent lines.

Conveniently the present invention also provides a method of beam control in a multi beam scanning system comprising the steps of:
  a. generating light beams each having an optical power;
  b. exposing a photosensitive member to said light beams to modify electrostatic voltages on said member;
  c. sensing said electrostatic voltages;
  and
  d. generating output signals relating to said voltages;
  characterized in that said method includes the steps of:
    i) comparing the output signals to generate a comparison result;
    and
    ii) controlling the optical powers of the light beams in accordance with said comparison result.

Further advantages and embodiments of the present invention will become apparent from the following description and drawings.

BRIEF DESCRIPTION OF THE DRAWINGS

FIG. 5a shows the electrostatic voltage difference between the output of two laser beams according to the same input/output levels of the printing system.

FIG. 5c shows the look-up table of the first laser beam.

FIG. 5d shows the look-up table of the second laser beam after intensity correction.

DETAILED DESCRIPTION OF THE INVENTION

Figure 1:
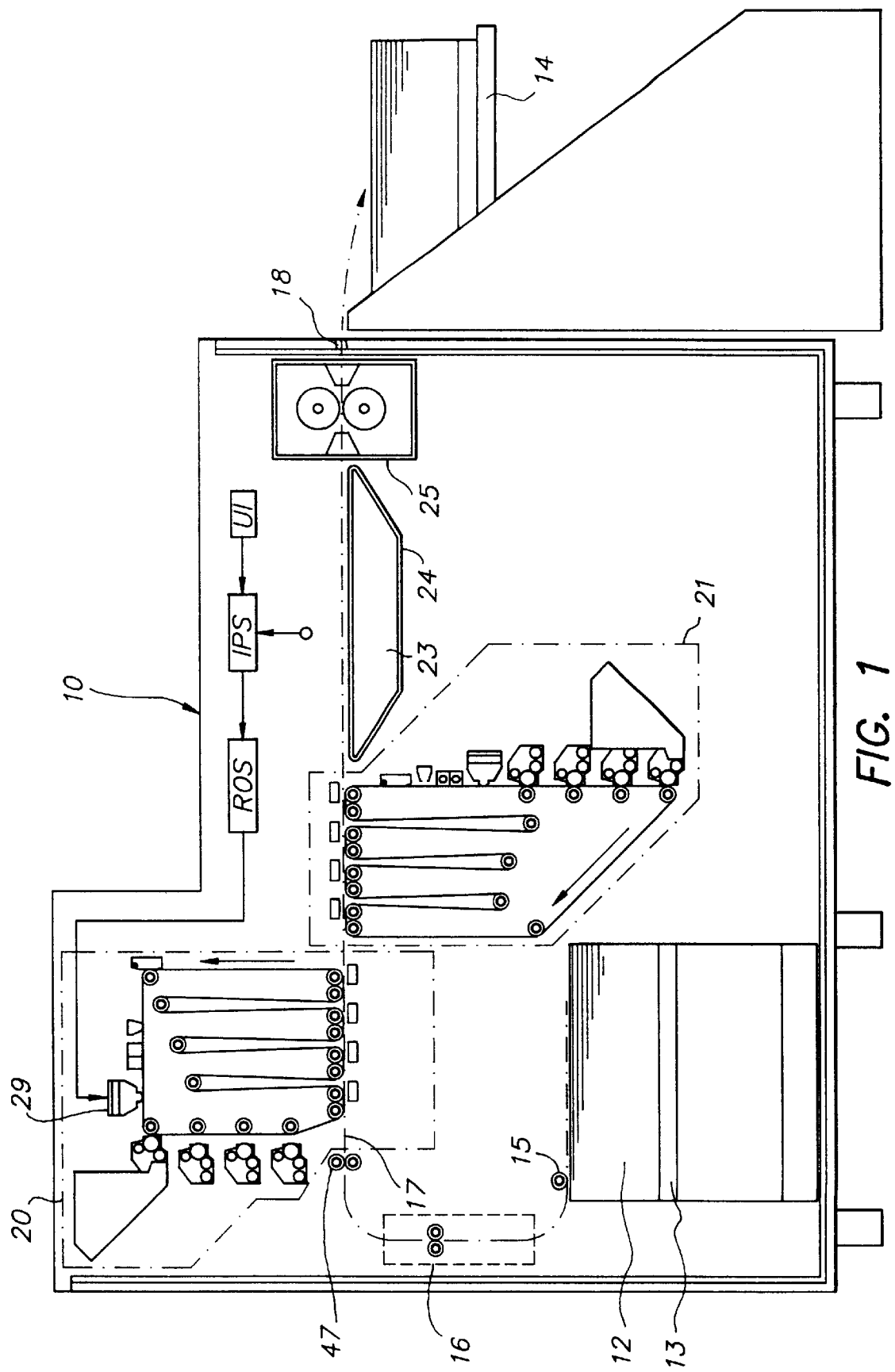
FIG. 1 shows a diagrammatic representation of one embodiment of an electrophotographic duplex color printer.

FIG. 1 shows a diagrammatic representation of one embodiment of an electrophotographic duplex colour printer.

The printer comprises a light tight housing 10 which has at its inside a stack 12 of sheets to be printed and loaded on a platform 13. The height of this platform 13 is adjusted in accordance with the size of the stack 12. At its output the printer has a platform 14 onto which the printed sheets are received.

A sheet to be printed is removed from stack 12 by a dispensing mechanism 15 which may be any mechanism known in the art such as a friction roller, a friction pad, a suction cup, or the like for removing the top sheet from stack 12.

The removed sheet is fed through an alignment station 16 which ensures the longitudinal and lateral alignment of the sheet, prior to its start from said station under the control of the imaging system. As the sheet leaves the alignment station, it follows a straight horizontal path 17 up to output section 18 of the printer. The speed of the sheet, upon entering said path, is determined by driven pressure roller pair 47.

The following processing stations are located along path 17.

A first image-forming station 20 indicated in a dash-and-dot line for applying a color image to the obverse side of the sheet.

A second station 21 is needed for applying a color image to the reverse side of the sheet.

A buffer station 23 with an endless belt 24 transports the sheet to fuser station 25, thereby allowing the speed of the sheet to change. This may be necessary since the speed of fuser station 25 may be different from that of the speed of image forming stations 20, 21.

The purpose of buffer 23 is as explained below. Fuser station 25 is operating to melt the toner particles transferred to the sheets in order to affix them. This operation requires a certain minimum time since the temperature of the fuser is subject to an upper limit which must not be exceeded. Otherwise the lifetime of the fuser roller becomes unsatisfactory. In other words, the speed of fuser station 25 is limited.

The speed of the image formation stations 20 and 21, on the other hand, is basically not limited for any particular reason. On the contrary, it is advantageous to use a high speed of image formation and image transfer, since the four color separations of each color image are recorded by exposure station 29 in succession, which means that the recording time of one color image amounts to at least four times the recording time of one color component. Therefore, a relatively high speed of the photoconductive belts is required, and thus of the synchronously moving sheets, as compared with a maximum usable travelling speed through the fuser station 25.

In the apparatus according to the present embodiment, the speed of the two photoconductive belts amounted to 295 $mm.s^{-1}$, whereas the fusing speed was 100 $mm.s^{-1}$ or less.

Furthermore, it may be desirable to adjust the fusing speed independently of the image processing speed, i.e. the belt speed, for obtaining optimum results. It should be noted that the image processing speed in the imaging stations is preferably constant.

The length of buffer station 23 is sufficient for receiving the largest sheet size to be processed in the apparatus.

Buffer station 23 is operating initially at the speed of the photoconductive belts of devices 20 and 21. The speed of this station is reduced to the processing speed of fuser station 25 as the trailing edge of the sheet has left device 21.

Fusing station 25 can be of known construction, and can be arranged for radiation or flash fusing, for fusing by convection and/or by pressure, etc. According to the present invention hot fusing is preferred. The fused sheet is finally received on platform 14.

A printing apparatus according to the present invention is not limited to the embodiment described hereinbefore.

One image-forming station, such as 20, need not necessarily operate with one exposure station, such as 29, but may include more than one exposure station, each such station co-operating with several developer units.

This electrophotographic printing apparatus is connected to a host system such as an external computer or word processor through a cable and prints an image on a sheet of paper in a predetermined color in accordance with dot image data supplied by the host system.

A printing apparatus according to the present invention is not limited to color reproduction but may also be a black-and-white printer.

A printing apparatus according to the present invention is not limited to duplex printing but may also be a single-side printer. The current invention is concentrated on the exposure station 29 which is described in more detail referring to FIG. 2.

Figure 2:
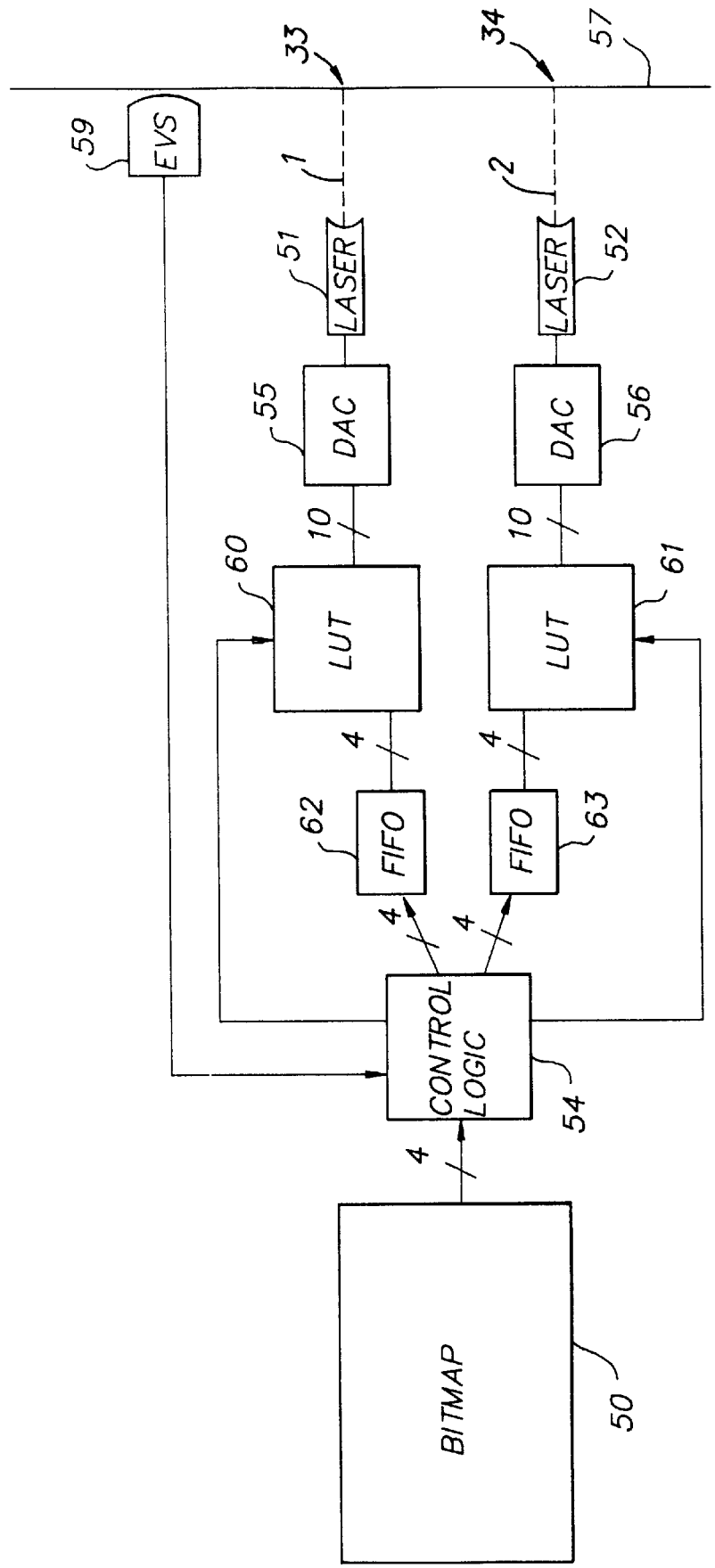
FIG. 2 gives a schematic overview of a multi-beam laser printer and the components.

FIG. 2 shows a bitmap 50. A bitmap is used to store an electronic image. The electronic image is an electronic representation of the image to be reproduced by the printer. For each picture element or pixel of the image to be reproduced, a pixel value is stored in the bitmap 50. The pixel values are arranged in a two-dimensional array, forming rows and columns.

In one embodiment, each pixel value may be represented by a 4-bit digital value, so that each pixel can have 16 different values.

For color images preferably one bitmap is stored for each color component of the image. For a cyan, magenta, yellow color printer, three bitmaps are sufficient. For a cyan, magenta, yellow and black color printer, four bitmaps may be required.

For black and white image, one bitmap may be sufficient. In the following description, one bitmap will be discussed. The other bitmaps may be treated in the same manner.

In FIG. 2 the signals from the bitmap 50 are transferred to the control logic 54. The signals from the control logic command the two lasers 51, 52. According to the preferred embodiment, laser 51 exposes lines 1, 3, 5, 7 . . . and laser 52 exposes line 2, 4, 6, 8 . . .

The signals are transferred to the LUTs (look-up tables) 60, 61 via FIFOs 62, 63 (first in first out memory). The contents of LUTs 60, 61 can be set by the control logic 54 and can be applied to the image signals from the FIFOs 62, 63 respectively according to the present invention. Via the two DACs 55, 56 (digital to analog converters) the analog signals drive the lasers 51, 52.

The lasers 51, 52 expose the photosensitive member 57 at the locations 33 and 34 via respective laser beams 1 and 2. The EVS 59 (electrostatic voltage sensor) measures the electrostatic potential at one spot of the photoconductive member 57.

The laser sources 51, 52 are fed by the signals of DACs 55, 56. In a preferred embodiment these DACs accept in a 10-bit data. This means that the system has more analog levels, i.e. $2^{10}=1024$, than the number of image levels, i.e. $2^4=16$.

Figures 3, 4:
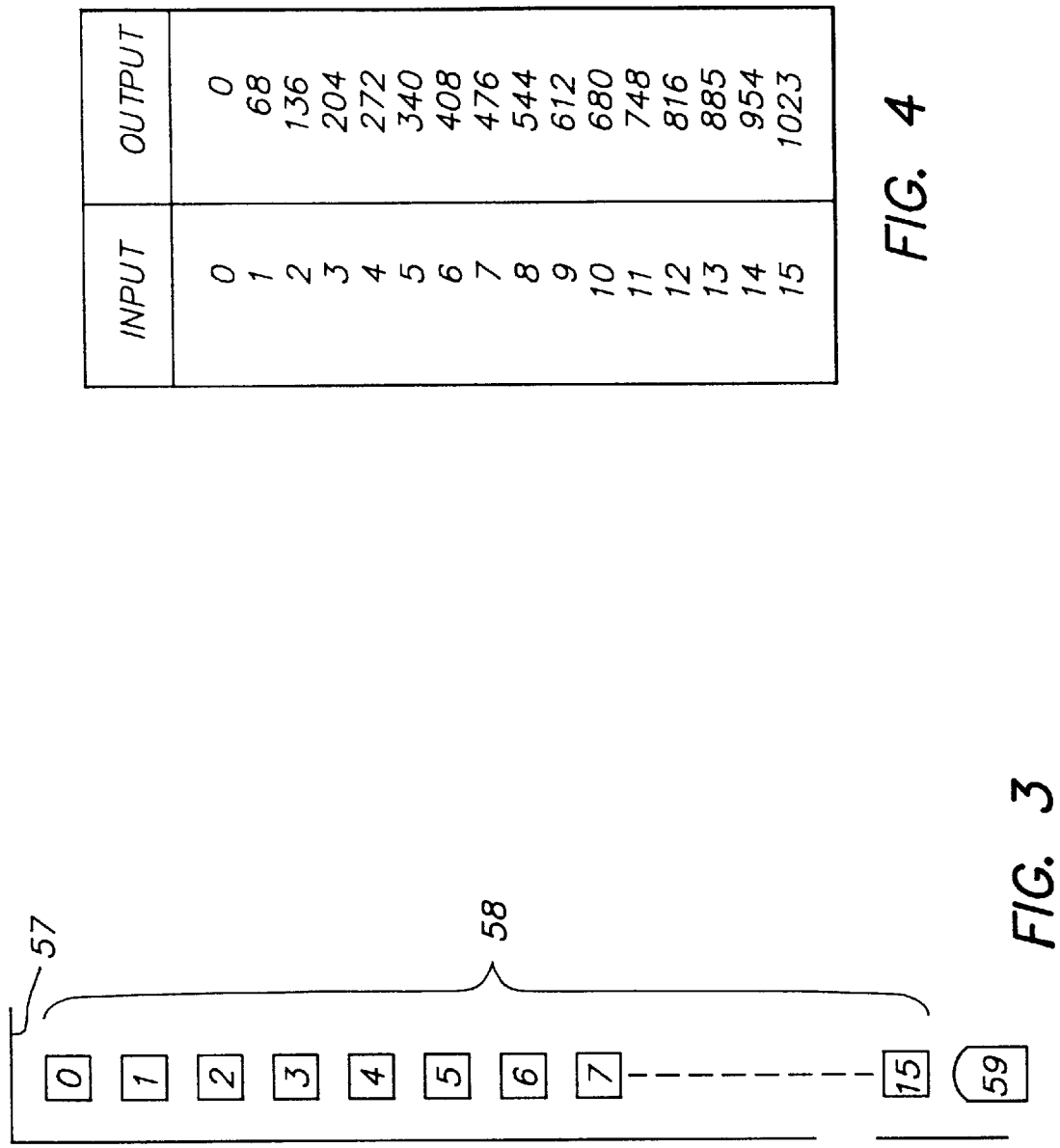
FIG. 3 shows a test pattern with 16 patches.
FIG. 4 shows a look-up table with input and output values.

To convert 4 to 10 bit, two LUTs 60, 61 may be used to transform the 16 different values of each pixel to one of the 1024 levels, even in a non-linear way. The transform defined by the LUT can be set and changed by the control logic 54. An example of such a transform is shown in FIG. 4. The 16 input levels range from 0 to 15, the 16 corresponding output levels range from 0 to 1023.

The changes are, preferably, based on the results of the measurements by the EVS 59 as will be discussed below.

According to this invention the plurality of LUTs 60, 61 are adapted to the performance of the plurality of lasers or laserdiodes 51, 52.

According to a test procedure visualized in FIG. 3, laser 51 scans a test pattern 58 on the photosensitive drum or belt 57. This test pattern preferably comprises 16 patches (5 mm×5 mm) representing the 16 available pixel levels (4-bit) from the bitmap. The 16 patches are exposed on the photosensitive member 57 on a vertical line where the EVS 59 is able to measure them. A LUT 60 as described above, transforms the 16 input levels to 16 different output levels chosen from a range of 1024 possible output levels. In other words for every input intensity level, the system has a corresponding output level from 0 to 1023.

To generate the test pattern, the photosensitive drum or belt 57, FIG. 3, is first loaded by a negative voltage and then exposed by the lasers 51, 52 to divert away at least a portion of the electrostatic charge, where toner particles must be attracted.

Via an EVS 59 the local electrostatic voltage can be measured on the drum or belt of the system. This results in test measurements for beam 1 as shown in FIG. 5a.

Patch 0, the first of 16, with output level 0 gives an electrostatic voltage of 375 V measured on the drum or belt.

Patch 1 with output level 68 applied to DAC gives an electrostatic voltage of 360 V. The results of the other patches are illustrated on FIG. 5a.

As a second step of the test procedure a second laser source 52 scans the same test pattern on the drum or belt. Via the same EVS 59 the electrostatic voltages on the drum or belt as a result of the second laser source exposures can be measured, see beam 2 on FIG. 5a.

Figure 5B:
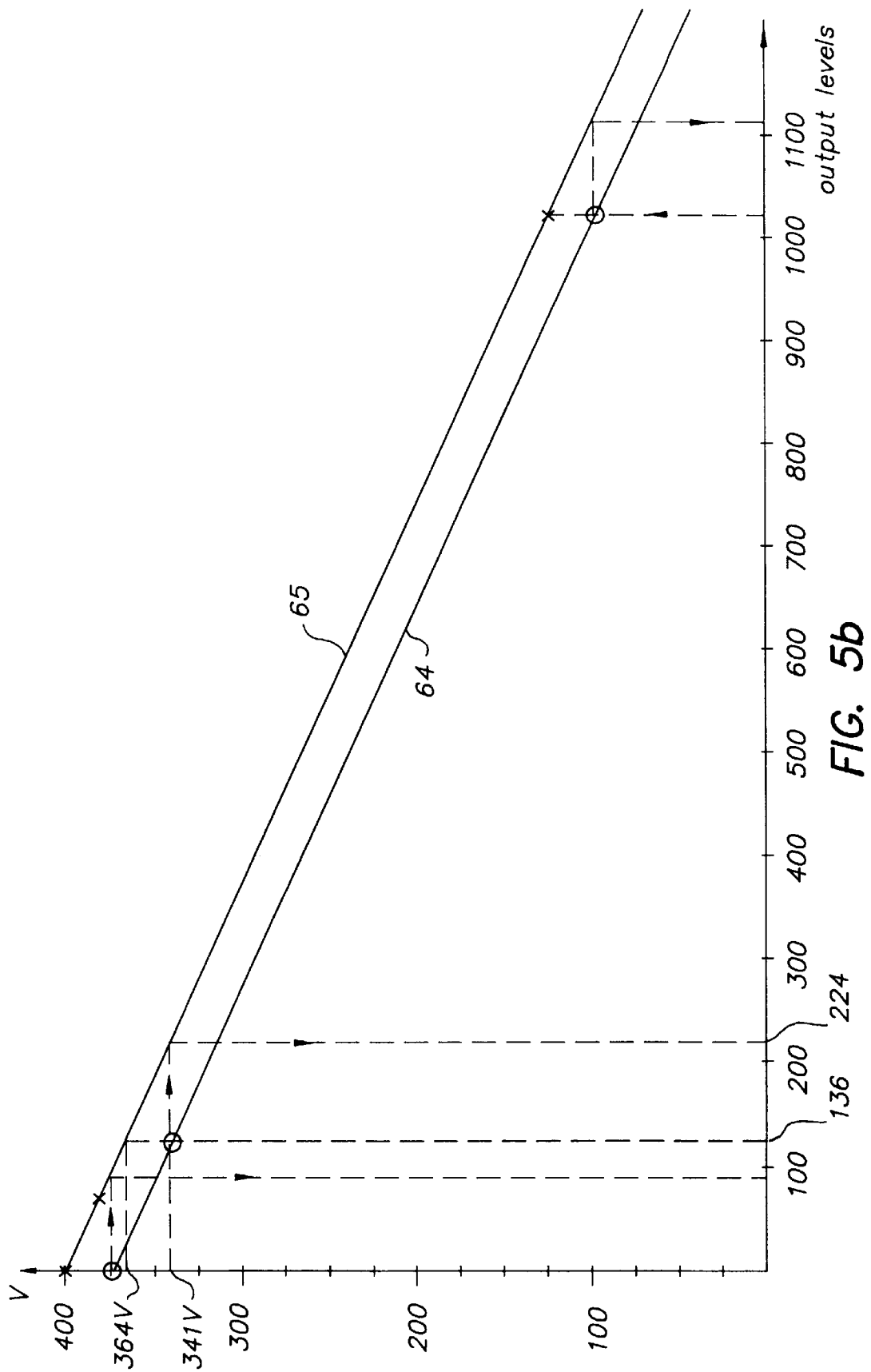
FIG. 5b shows a graph with the relation between the electrostatic output voltage V of the two laser beams and the output levels of the printing system.

Comparing the EVS-results of the two laser exposures gives the opportunity to compensate for the electrostatic voltage difference produced by the two lasers by changing one of the two LUTs 60 and 61, FIG. 2. For the same output level 136, FIG. 5a, the EVS results on the photosensitive member should be equal for the two laser beams 1 and 2. However the electrostatic voltage measured on patch 2 for laser beam 1 is 341 V whereas the electrostatic voltage for laser beam 2 is 364 V. The graph on FIG. 5b shows the conversion to adapt laser beam 2 to laser beam 1, wherein the electrostatic voltage as a function of the output level 64 for the first laser 51 and the electrostatic voltage as a function of the output level 65 for the second laser 52 is shown.

In order to get the same electrostatic voltage of 341 V on the photosensitive member by laser beam 2, the output value in the LUT of laser beam 2 needs to be 224 instead of 136.

When all the other output levels of laser beam 2 are adapted to laser beam 1 in the same way, the exposure system is calibrated and will give homogeneous results.

FIG. 5c gives an example of a look-up table for laser beam 1 and FIG. 5d gives the corrected look-up table for laser beam 2. Since in a 10-bit system the value of 1110, FIG. 5d, cannot be achieved, it may be necessary to scale down all output values for beam 1 and to calibrate beam 2 again.

Figure 6:
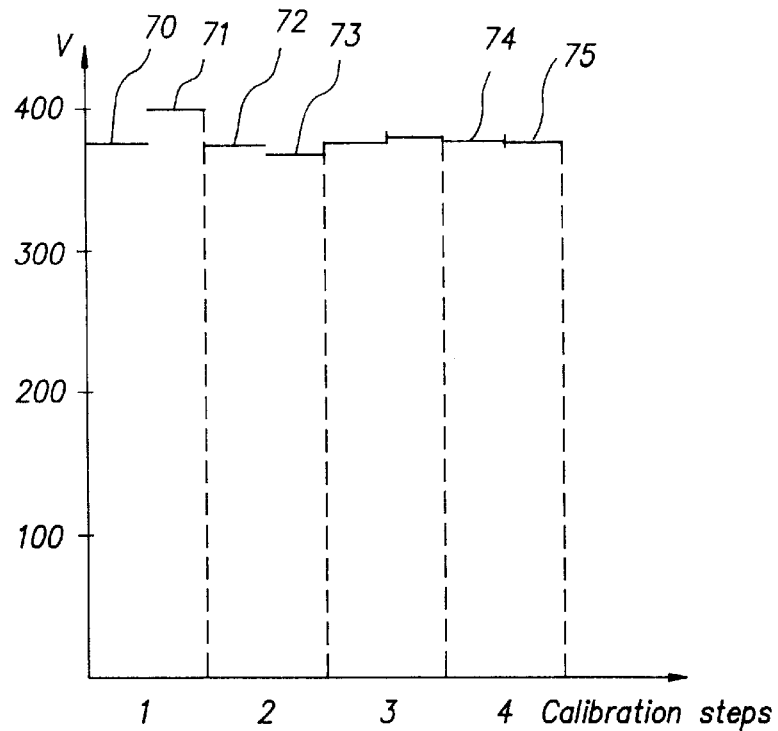
FIG. 6 shows the electrostatic voltage difference of the two laser beams for patch 1, 2, 3 and 4.

In a second test procedure, FIG. 6, one beam, defined as reference, and a second variable beam expose the photosensitive member, the second immediately after the first.

In this case the EVS only has to measure the electrostatic voltage differences between the patches produced by the reference beam and the beam that need to be attuned. With these differences, the system can calculate the necessary adaptations to the output LUT of the beam to be tuned. The corrected LUT is responsible for slightly different drive currents which result in higher or lower optical power. The first calibration step of FIG. 6 shows the electrostatic voltage 70 as a result of the exposure of beam 1 and the electrostatic voltage 71 as a result of the exposure of beam 2. The second calibration step shows the same electrostatic voltage 72 for beam 1 and a corrected value 73 for beam 2.

Calibration step 4 shows a calibrated exposure system where the electrostatic voltages 74,75 of beams 1 and 2 are substantially the same. Tuning of the electrostatic voltage produced by beam 2 may be achieved by suitable modifications of the output value sent to DAC 56.

Figure 7:
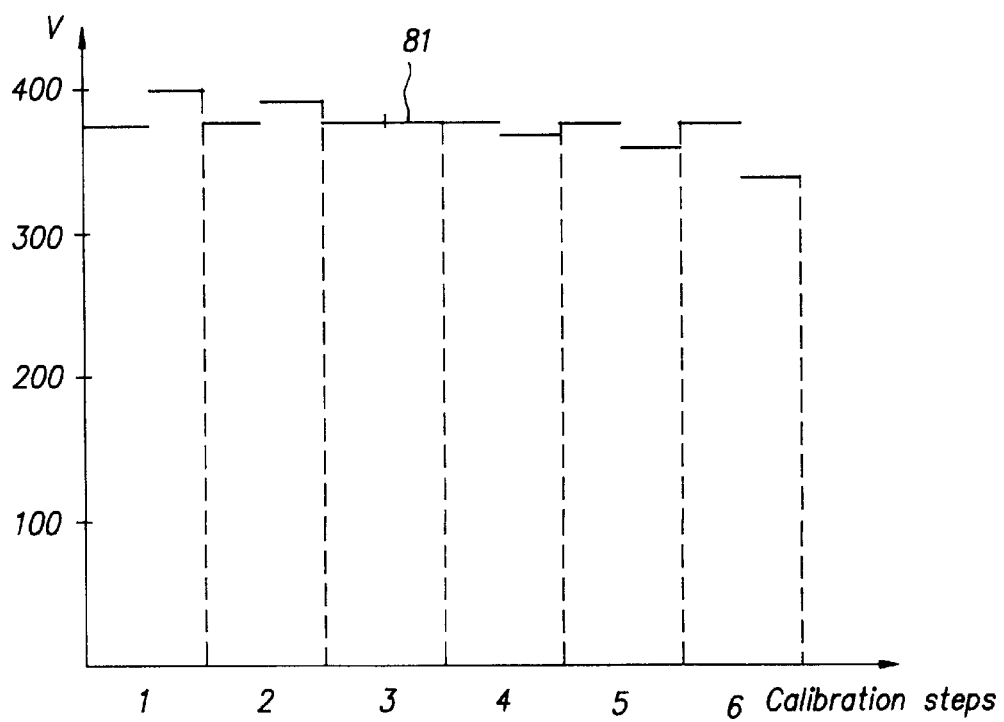
FIG. 7 shows the electrostatic voltage difference of the two laser beams for patch 1 to 6.

In a third test procedure (FIG. 7), a plurality of exposures with beam 1 and beam 2 are executed, wherein the drive current for laser 52 is slightly lowered after every patch. Based on the EVS-results of beam 2 compared to beam 1, the best match value (81) is selected, optionally after interpolation of the neighbouring results.

An electrostatic voltage sensor (EVS) or an electrostatic sensor is well known in the art.

The model ESV-SDM-50 of the company Trek Inc. is an example of an on-board electrostatic sensor used by many copier and laser printer manufacturers around the world.

The Trek OBC (on-board electrostatic sensor) accomplishes voltage measurements without physical contact with the surface of the drum or belt. This technique assures no loading of the voltage on the surface of the drum and this technique permits accurate measurements on drum or belt surfaces when these are in motion.

The design of Trek OBC's gives high gain and a high signal-to-noise ratio for high accuracy, high speed of response, and superior noise and drift performance.

The field-nulling technique for non-contacting voltage measurement maintains D.C. stability and high accuracy in the presence of probe-to-surface spacing variations. This permits measurements on rotating drums without the need to establish a constant spacing to maintain accuracy.

The measurement range of the input of the EVS is 0 to 1.000 V. The output monitor range goes from 0 to +5 V.

The accuracy is ±3% and the speed response is less than 25 msec for a 1 kV step input (10%–90%). The noise is less than 2% (100 mV rms).

An alternative for the EVS is an Image Density Sensor (IDS). An Image Density Sensor, as known in the art, is a contactless densitometer for reflection density measurements of the toner image on the photosensitive member such as an organic photoconductor (OPC). An IDS measures the density of the OPC surface covered with deposited toner.

An IDS is built according to the specifications of the manufacturer of printers or copiers.

The measurement range of the IDS is preferably made suitable to a deposited toner mass, situated between 0 and 0.7 mg/cm$^2$ deposited on the OPC. The accuracy of the IDS is preferentially better than 0.01 mg/cm$^2$. In a preferred embodiment there is only one sensor needed for the four color toners.

Comparing the optical densities of the toner images on the OPC of the test patterns written by the two (or more) lasers and developed by a toner application unit, is a second tool for attuning the lasers.

I claim:

1. A system for generating a latent image on a photosensitive member comprising:

means for generating a first light beam and a second light beam, each having an optical power;

a photosensitive member for exposure by said first and second light beams, thereby modifying a first and a second electrostatic voltage at a first and a second location on said photosensitive member;

an electrostatic voltage sensor for sensing said first and second electrostatic voltages, thereby generating a first and a second output signal;

means for comparing said first and second output signals, thereby generating a comparison result; and means for controlling said optical power of said first light beam based on said comparison result.

2. The system of claim 1, further comprising optical scanning means for directing said first and second light beams toward said photosensitive member.

3. The system of claim 1, wherein said photosensitive member converts local exposure by said first and second light beams to local electrostatic voltages on said photosensitive member.

4. The system of claim 2, wherein said photosensitive member converts local exposure by said first and second light beams to local electrostatic voltages on said photosensitive member.

5. The system of claim 4, wherein said light beam generating means includes a laser or a laser diode.

6. The system of claim 1 further comprising:

means for generating a first test pattern on said photosensitive member using said first light beam;

means for generating a second test pattern on said photosensitive member, using said second light beam;

means for comparing an electrostatic voltage sensed on said first test pattern with an electrostatic voltage sensed on said second test pattern, thereby generating said comparison result.

7. The system of claim 6, wherein said means for comparing equalizes electrostatic voltages achieved by exposure of said photosensitive member by a plurality of light beams including said first and second light beams.

8. The system of claim 1, wherein said first and second light beams create pairs of adjacent lines.

9. A method of beam control in a multi-beam scanning system comprising the steps of:

generating light beams each having an optical power;

exposing a photosensitive member to said light beams to modify electrostatic voltages on said photosensitive member;

sensing said electrostatic voltages;

generating output signals relating to said voltages;

comparing the output signals to generate a comparison result; and controlling the optical powers of the light beams in accordance with said comparison result.

* * * * *